United States Patent [19]

Sejpka et al.

[11] Patent Number: 5,336,715

[45] Date of Patent: Aug. 9, 1994

[54] ORGANOPOLYSILOXANE COMPOSITION

[75] Inventors: Johann Sejpka, Marktl; Dieter Gerhardinger; Franz Wimmer, both of Burghausen, all of Fed. Rep. of Germany

[73] Assignee: Wacker-Chemie, Munich, Fed. Rep. of Germany

[21] Appl. No.: 14,587

[22] Filed: Feb. 8, 1993

[30] Foreign Application Priority Data

Feb. 13, 1992 [DE] Fed. Rep. of Germany ....... 4204306

[51] Int. Cl.$^5$ .............................................. C08K 5/05
[52] U.S. Cl. ................................ 524/765; 524/767; 524/769; 524/845; 528/26; 528/26.5
[58] Field of Search ............... 524/765, 769, 767, 845; 528/26, 26.5

[56] References Cited

U.S. PATENT DOCUMENTS

| | | | |
|---|---|---|---|
| 3,355,424 | 11/1967 | Brown | 528/33 |
| 4,081,419 | 3/1978 | Shimizu et al. | 524/853 |
| 4,661,551 | 4/1987 | Mayer et al. | 524/379 |
| 5,045,231 | 9/1991 | Braun et al. | 824/860 |

FOREIGN PATENT DOCUMENTS

| | | |
|---|---|---|
| 0068671 | 1/1983 | European Pat. Off. |
| 0186265 | 7/1986 | European Pat. Off. |
| 1271865 | 7/1968 | Fed. Rep. of Germany |
| 3100030 | 8/1982 | Fed. Rep. of Germany |
| 3447636 | 7/1986 | Fed. Rep. of Germany |
| 1199501 | 7/1970 | United Kingdom |

OTHER PUBLICATIONS

D. Werf, Silicone-Chemie & Technologie (Silicones Chemistry and Technology), Vulkan-Verlag Essen, 1st Edition, 1989 et seq.

W. Noll, "Chemie und Technologie der Silicone" (Silicone Chemistry and Technology), Verlag Chemie, Weinheim, 2nd Edition, 1968, p. 178 et seq.

*Primary Examiner*—John C. Bleutge
*Assistant Examiner*—Mark D. Sweet
*Attorney, Agent, or Firm*—Martin Connaughton

[57] ABSTRACT

Organopolysiloxane compositions which comprise (A) a salt of a water-soluble organic or inorganic acid and an organopolysiloxane which has at least one SiC-bonded organic radical containing basic nitrogen, and (B) an alkoxylated alcohol and also, optionally, (C) a salt of a water-insoluble organic acid and an organopolysiloxane, which has at least one SiC-bonded organic radical containing basic nitrogen.

8 Claims, No Drawings

ORGANOPOLYSILOXANE COMPOSITION

The present invention relates to organopolysiloxane compositions and more particularly to water-dilutable organopolysiloxane compositions, processes for preparing the same and their use as impregnating agents.

BACKGROUND OF THE INVENTION

Agents for imparting hydrophobic properties, especially to glass surfaces, which comprise isopropanol, water and a reaction product of a hydroxy-terminated, basic nitrogen-containing organopolysiloxane with organic and inorganic acids, are described in British Patent 1,199,501 (Boeing Co.). The preparation of polyaminoalkyl-substituted organopolysiloxanes and their reaction with acids to form the corresponding salts and their use as agents for rendering textiles hydrophobic are described in U.S. Pat. No. 3,355,424 (Dow Corning Corp.). Furthermore, the use of specially modified aminosiloxanes and their salts as an anti-icing protective coating for articles is disclosed in German Auslegeschrift (German Published Specification) 1 271 865. Compositions which comprise (1) a mixture and/or reaction product of (A) a salt of an organopolysiloxane containing at least one amino group as well as at least one reactive group —OX, where X represents a hydrogen atom, an alkyl radical or an alkoxyalkyl radical, with (B) an organosilicon compound which has at least two reactive groups —OX and is soluble in a water-soluble solvent and (2) a water-soluble solvent are described in European Published Specification 186 265 A (Dow Corning Ltd.; published on Jul. 2, 1986) and European Published Specification 68 671 A (Dow Corning Ltd.; published on Jan. 5, 1983). In addition, compositions which comprise (A) a salt of a water-soluble organic or inorganic acid and aminosiloxane, optionally (B) aminosiloxane and also, optionally, water-insoluble organic solvent free from halogen atoms, are disclosed in DE 3 447 636 A (Wacker-Chemie GmbH: published on Jul. 3, 1986) and corresponding U.S. Pat. No. 4,661,551 (published on Apr. 28, 1987), in which these compositions are essentially free from water soluble solvents or octanols. These compositions and their dilutions with water are used as impregnating agents, and in particular as agents for imparting hydrophobic properties, however, the aqueous dilutions do not have sufficient active compound stability.

Therefore, it is an object of the present invention to provide an organopolysiloxane composition which is dilutable with water in all proportions. Another object of the present invention is to provide a water-dilutable organopolysiloxane composition which is clear to slightly opaque. Still another object of the present invention is to provide an organopolysiloxane composition containing water which is very stable and exhibits no phase separation. A further object of the present invention is to provide a water-dilutable organopolysiloxane composition which imparts water repellent properties to various substrates. A still further object of the present invention is to provide a process for preparing a water-dilutable organopolysiloxane composition.

SUMMARY OF THE INVENTION

The foregoing objects and others which will become apparent from the following description are accomplished in accordance with this invention, generally speaking, by providing water-dilutable organopolysiloxane compositions comprising (A) a salt of a water-soluble organic or inorganic acid and an organopolysiloxane which has at least one SiC-bonded organic radical containing basic nitrogen, and (B) an alkoxylated alcohol and, optionally, (C) a salt of a water-insoluble organic acid and organopolysiloxane which has at least one SiC-bonded organic radical containing basic nitrogen.

DESCRIPTION OF THE INVENTION

The organopolysiloxanes which have at least one SiC-bonded organic radical containing basic nitrogen, are preferably those having units of the general formula

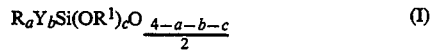

in which R can be the same or different and represents a hydrogen atom or a monovalent organic radical free from basic nitrogen, $R^1$ can be the same or different and represents a hydrogen atom, an alkyl radical or an alkoxyalkyl radical, Y can be the same or different and represents a monovalent, SiC-bonded radical containing basic nitrogen, a is 0, 1, 2 or 3, b is 0, 1 or 2 and c is 0, 1, 2 or 3, with the proviso that the sum of a, b and c in the units of formula (I) is less than or equal to 3 and that at least one radical Y is present per molecule.

In the above formula, the radical R is a hydrocarbon radical having from 1 to 18 carbon atoms, in which the methyl radical, ethyl radical, n-propyl radical, iso-propyl radical and n-butyl radical, are the preferred radicals and the methyl radical is the more preferred radical.

Examples of radicals represented by R are alkyl radicals, such as the methyl, ethyl, n-propyl, iso-propyl, n-butyl, iso-butyl, tert-butyl, n-pentyl, iso-pentyl, neopentyl and tert-pentyl radicals; hexyl radicals, such as the n-hexyl radical; heptyl radicals, such as the n-heptyl radical; octyl radicals, such as the n-octyl radical and iso-octyl radicals, such as the 2,2,4-trimethylpentyl radical, nonyl radicals, such as the n-nonyl radical; decyl radicals, such as the n-decyl radical; dodecyl radicals, such as the n-dodecyl radical, and octadecyl radicals, such as the n-octadecyl radical, alkenyl radicals, such as the vinyl radical and the allyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the α- and β-phenylethyl radicals.

The radicals $R^1$ are preferably alkyl radicals having from 1 to 4 carbon atoms, in which the methyl and ethyl radicals are the preferred radicals.

All of the examples of alkyl radicals represented by R mentioned above are also representative of the radical $R^1$.

The radicals Y are preferably those of the formula

in which $R^2$ can be the same or different and represents hydrogen or alkyl, cycloalkyl or aminoalkyl radicals and $R^3$ represents divalent hydrocarbon radicals.

All of the examples of alkyl and cycloalkyl radicals R mentioned above are also representative of the alkyl and cycloalkyl radicals $R^2$.

Preferably at least one hydrogen atom is bonded to each nitrogen atom in the radicals of formula (II).

Examples of the radical $R^3$ are the methylene, ethylene, propylene, butylene, cyclohexylene, octadecylene, phenylene and butenylene radicals in which the n-propylene radical is preferred because of its availability.

Examples of radicals Y are $H_2N(CH_2)_3—$, $H_2N(CH_2)_2NH(CH_2)_3—$, $H_2N(CH_2)_2—$, $H_3CNH(CH_2)_3—$, $H_2N(CH_2)_4—$, $H_2N(CH_2)_5—$, $H(NHCH_2CH_2)_3—$, $C_4H_9NH(CH_2)_2NH(CH_2)_2—$ and cyclo-$C_6H_{11}NH(CH_2)_3—$, in which $H_2N(CH_2)_2NH(CH_2)_3—$ is particularly preferred.

The average value of a is preferably between 1.66 and 1.99, and more preferably between 1.40 and 1.96.

The average value of b is preferably between 0.01 and 0.25, and more preferably between 0.03 and 0.17.

The average value of c is preferably between 0 and 0.63, and more preferably between 0 and 0.45.

The organopolysiloxanes composed of units of general formula (I) preferably have a viscosity of from 5 to 5000 cSt, and more preferably 10 to 100 cSt, at 25° C.

The organopolysiloxanes composed of units of formula (I) contain basic nitrogen in amounts of preferably from 0.1 to 4.2% by weight, and more preferably from 0.7 to 2.8% by weight and in particular from 1.0 to 2.1% by weight, based on the total weight of the organopolysiloxane. Here, the term "basic nitrogen" refers to nitrogen calculated as the element.

The organopolysiloxanes composed of units of formula (I) are preferably essentially straight-chain organopolysiloxanes having a ratio of diorganosiloxy units containing basic nitrogen-free, SiC-bonded radicals to diorganosiloxy units containing SiC-bonded radicals containing basic nitrogen of preferably 300:1 to 5:1, and more preferably from 50:1 to 10:1 and in particular from 40:1 to 15:1.

Examples of organopolysiloxanes composed of units of formula (I) are

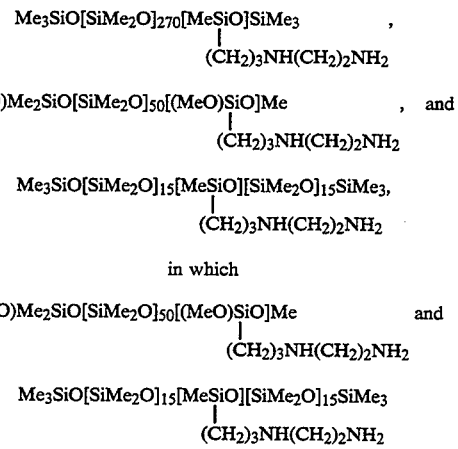

are preferred and

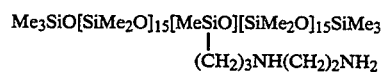

is more preferred.

Processes for the preparation of organopolysiloxanes composed of units of formula (I) are generally known.

In this context reference is made, for example, to D. Werf, Silicone-Chemie und Technologie (Silicones-Chemistry and Technology), Vulkan-Verlag Essen, 1st Edition, 1989, page 89 et seq., W. Noll, "Chemie und Technologie der Silicone" ("Silicone Chemistry and Technology"), Verlag Chemie, Weinheim, 2nd Edition, 1968, page 178 et seq. and the above-mentioned DE 34 47 636 A.

The water-soluble organic or inorganic acids which are used to prepare constituent A of the composition of this invention can be the same acids which have been or could have been used heretofore in the preparation of salts of a water-soluble organic or inorganic acid and an organopolysiloxane containing SiC-bonded radicals having a basic nitrogen.

Examples of such water-soluble acids are formic acid, acetic acid, propionic acid, butyric acid, diethyl hydrogen phosphate, HCl, $H_2SO_4$ and $H_3PO_4$, acetic acid and $H_2SO_4$, in which acetic acid is the preferred acid.

The water-insoluble organic acids which are used to prepare constituent (C) of the composition of this invention can likewise be the same acids which have been or could have been used heretofore in the preparation of salts of organopolysiloxanes containing SiC-bonded radicals having a basic nitrogen. Examples of such water-insoluble acids are oleic acid, palmitic acid and stearic acid, in which oleic acid is the preferred acid.

The composition of this invention contains constituent (C) in amounts of preferably from 0 to 250% by weight, and more preferably from 0 to 125% by weight, based on the total weight of constituent (A).

Constituent (B) of the composition of this invention is preferably alkoxylated saturated alcohols having from 2 to 18 carbon atoms, and more preferably having from 4 to 14 carbon atoms, and containing preferably from 1 to 20 ethylene oxide and/or propylene oxide units, and more preferably containing 1 to 12 ethylene oxide and/or propylene oxide units.

Examples of constituent (B) are 2-butoxyethanol and fatty alcohol polyglycol ethers based on isotridecyl alcohol containing 6 to 15 ethylene oxide units.

The composition of this invention contains constituent (B) in amounts of preferably from 0.1 to 200% by weight, and more preferably from 25 to 150% by weight, based on the total weight of constituent (A).

In addition to constituents (A), (B) and optionally (C), the compositions of this invention can also contain additional substances, such as, for example, quaternary ammonium compounds (D), cyclic diorganopolysiloxanes (E) and alkoxysilanes (F).

The quaternary ammonium compounds (D) are preferably those of the general formula

in which $R^4$ can be the same or different and represents a monovalent organic radical, X represents an anion, such as a halide, sulfate, phosphate, nitrate, acetate, oleate or carboxylate ion, and v is equal to the reciprocal value of the valency of the anion.

The radical $R^4$ is preferably a hydrocarbon radical having from 1 to 20 carbon atoms, the methyl radical and hydrocarbon radicals having from 8 to 18 carbon atoms being particularly preferred.

Examples of the radical $R^4$ are the examples indicated for the radical R as well as coconutalkyl, dicoconutalkyl and ditallowfattyalkyl radicals, in which a coconutalkyl radical is understood to be a mixture of hydrocarbon radicals having from 10 to 18 carbon atoms.

The radical X is preferably an acetate, oleate or halide radical, in which the chloride radical is preferred.

Examples of constituent (D), which is optionally present in the composition, are dicoconutalkyldimethylammonium chloride, ditallowfattyalkyldimethylammonium chloride and coconutalkyldimethylbenzylammonium chloride, in which the ditallowfattyalkyldimethylammonium chloride and the coconutalkyldimethylbenzylammonium chloride is preferred and coconutalkyldimethylbenzylammonium chloride is more preferred.

The composition of this invention contains constituent (D) in amounts of preferably from 0 to 100% by weight, and more preferably from 25 to 75% by weight, based on the total weight of constituent (A).

The cyclic organopolysiloxanes (E) are preferably those of the formula

(IV)

in which $R^5$ can be the same or different and has the same meaning as indicated for R and t is a number of from 3 to 7.

The radical $R^5$ is preferably a methyl, ethyl or ethoxy radical, in which the methyl radical is particularly preferred.

The value of t is preferably 4, 5 or 6, and more preferably t is 4 or 5.

Examples of constituent (E) are hexamethylcyclotrisiloxane, octamethylcyclotetrasiloxane and decamethylcyclopentasiloxane in which octamethylcyclotetrasiloxane and decamethylcyclopentasiloxane are particularly preferred.

The composition of this invention contains constituent (E) in amounts of preferably from 0 to 75% by weight, and more preferably from 0 to 50% by weight, based on the total weight of constituent (A).

The alkoxysilanes (F) are preferably those of the formula

(V)

in which $R^6$ can be the same or different and represents a hydrogen atom or a monovalent, basic nitrogen-free organic radical, $R^7$ can be the same or different and represents hydrogen or an alkyl radical and d is 0, 1, 2 or 3, and more preferably d is 1.

The radicals $R^6$ are preferably alkyl radicals having from 1 to 20 carbon atoms, in particular alkyl radicals having from 6 to 10 carbon atoms.

Examples of the radical $R^6$ are the examples indicated for the radical R.

The radicals $R^7$ are preferably alkyl radicals having from 1 to 5 carbon atoms, in particular the methyl and ethyl radicals.

Constituent (F) is preferably isooctyltrimethoxysilane.

The composition of this invention contains constituent (F) in amounts of preferably from 0 to 200% by weight and more preferably from 0 to 100% by weight, based on the total weight of constituent (A).

The compositions of this invention are prepared by mixing an organopolysiloxane, which has at least one SiC-bonded radical containing basic nitrogen, with a water-soluble organic or inorganic acid to form constituent (A), and optionally with a water-insoluble organic acid to form constituent (C), and with constituent (B) as well as, optionally, additional components. Mixing is carried out at a temperature of preferably from 10° to 40° C., and more preferably from 15° to 25° C., and under a pressure of preferably 900 to 1100 hPa. However, mixing can also be carried out under higher or lower pressures.

The compositions of this invention are dilutable with water in all proportions. The compositions of this invention can contain water in amounts of preferably from 0 to 70% by weight, and more preferably from 10 to 65% by weight, based on the total weight of constituent (A).

Irrespective of the amount of water present, the composition of this invention is a clear to slightly opaque liquid which has a viscosity of preferably from 5 to 5000 cSt, and more preferably from 10 to 1000 cSt and in particular from 40 to 100 cSt, at 25° C.

The compositions of this invention which contain water have the advantage that they are very stable and no phase separation can be observed and no changes occur whatsoever in the activity of the active compound, even at a temperature change of from +40° C. to 0° C. in 6 hour cycles during an observation period of more than 30 days.

The compositions of this invention are especially suitable as agents for imparting water-repellent properties in or on gas concrete, as an additive for gypsum, plasters and water-dilutable paints, in order to render these substances water-repellent. In general, the compositions of this invention are suitable as agents for imparting water-repellent properties and, where appropriate, post-repellent properties to building materials, including facades, roads and bridges, as agents which are introduced through holes into the wall in order to provide a barrier against rising wall dampness, or as agents to provide a barrier against other undesirable water migration.

In addition, the compositions of this invention are suitable for impregnating finely divided inorganic substances, such as perlite, vermiculite or fillers, as agents for imparting hydrophobic properties to metals, organic fibers, such as textiles, leather, paper or heat-insulating materials, as additives for polishes, as dispersing agents and as additives for the polymerization of monomers containing an aliphatic carbon-carbon double bond, such as vinyl chloride or vinyl acetate, and as flow-improving agents in water-dilutable coating compositions.

The compositions of this invention can be applied to the substrate to be treated by, for example, spraying, coating or dipping.

In addition, the compositions of this invention can be used for all applications in which organosilicon compounds in water-dilutable form have also been used heretofore.

In the following examples, all viscosity data is at a temperature of 25° C. Unless otherwise indicated, the following examples are carried out under a pressure of the ambient atmosphere, that is, at about 1000 hPa, and at room temperature, that is, at about 23° C., or at a temperature which is attained on adding the reactants together at room temperature, without additional heating or cooling. In addition, all parts and percentages are by weight, unless otherwise specified.

EXAMPLE 1

Preparation of Aminosiloxane (I)

(A) About 400 g of α,ω-dihydroxydimethylpolysiloxane having a viscosity of about 40 mm²/s are mixed with 80 g of N-(2-aminoethyl)-3-aminopropyltrimethoxysilane (commercially available under the trade name "GF 91" from Wacker-Chemie GmbH) and 50 g of trimethoxymethylsilane and the mixture is heated to 95° C. with continuous stirring and under reflux and maintained at this temperature for 4 hours. The readily volatile constituents are then distilled off at 95° C. for one hour. A clear, amino-functional siloxane is obtained which has a viscosity of 50 mm²/s and an amine value (number of ml of 1N HCl required to neutralize 1 g of substance) of 1.4.

(B) About 40 parts of the aminosiloxane (IA) prepared above, 3 parts of acetic acid (99.8% in water), 7 parts of oleic acid, 25 parts of butyl glycol and 25 parts of coconutalkyldimethylbenzylammonium chloride (commercially available under the trade name "Dodigen 226" from Hoechst AG) are mixed, with continuous stirring. A yellowish, clear mixture is obtained which has a viscosity of about 100 mm²/s.

EXAMPLE 2

Preparation of Aminosiloxane (II)

(A) About 400 g of α,ω-trimethylsiloxydimethylpolysiloxane having a viscosity of 250 mm²/s are initially introduced with 0.5 g of a 20% KOH solution in methanol and the mixture is heated to 110° C., with continuous stirring, and maintained at this temperature for one hour. About 70 g of N-(2-aminoethyl)-3-aminopropyltrimethoxysilane (commercially available under the trade name "GF 91" from Wacker-Chemie GmbH) are then added dropwise over a period of 30 minutes and the mixture is stirred at this temperature for 2 hours. After cooling to 50° C., 0.5 g of aqueous HCl solution (18% strength) is added and the product is distilled off at a temperature of 160° C. and a pressure of 1000 hPa. After cooling, the product is mixed with 5 g of active charcoal and then filtered. A clear, amino-functional siloxane is obtained which has a viscosity of 20 mm²/s and an amine value (number of ml of 1N HCl required to neutralize 1 g of substance) of 1.2.

(B) About 36 parts of the aminosiloxane (IIA) prepared above, 2 parts of acetic acid (99.8% in water), 6 parts of oleic acid, 23 parts of butyl glycol, 10 parts of isotridecyl ethoxylate containing about 10 ethylene oxide units and 23 parts of coconutalkyldimethylbenzylammonium chloride (commercially available under the trade name "Dodigen 226" from Hoechst AG) are mixed, with continuous stirring. A yellowish, clear mixture is obtained which has a viscosity of about 70 mm²/s.

(C) About 1 part of the organopolysiloxane composition (B) thus obtained is then mixed with 100 parts of water. Gas concrete bricks are dipped in this solution for a period of 60 seconds and then dried at room temperature for 14 days. The capillary absorption of water by the gas concrete bricks treated in this manner is compared with untreated gas concrete bricks by completely covering the bricks with water in a water bath for a period of 7 hours. Data with respect to the absorption of water in %, in each case with respect to the weight of the gas concrete bricks, as a function of the time in the water bath, are given in Table 1.

TABLE 1

| Gas concrete bricks | 1 hr. | 2 hrs. | 3 hrs. | 5 hrs. | 7 hrs. |
|---|---|---|---|---|---|
| Treated with the solution according to the invention | 2.65% | 4.62% | 6.41% | 9.86% | 13.50% |
| Untreated | 30.70% | 36.10% | 39.80% | 45.70% | 51.20% |

What is claimed is:

1. An organopolysiloxane composition which comprises;
   (A) a salt of a water-soluble organic or inorganic acid and an organopolysiloxane which has at least one SiC-bonded organic radical containing basic nitrogen, of the general formula $$R_a Y_b Si(OR^1)_c O_{\frac{4-a-b-c}{2}} \quad (I)$$

in which R is a hydrogen atom or a monovalent organic radical free of basic nitrogen, $R^1$ is a hydrogen atom or an alkyl radical, Y is a monovalent SiC-bonded radical containing basic nitrogen, a is 0, 1, 2 or 3, b is 0, 1, or 2 and c is 0, 1, 2 or 3, with the proviso that the sum of a, b and c in the units of formula (I) is less than or equal to 3 and that at least one radical Y is present per molecule,
   (B) an alkoxylated alcohol, and
   (C) a salt of a water-insoluble organic acid and the organopolysiloxane (A) of the general formula (I).

2. The organopolysiloxane composition of claim 1, where Y is a radical of the formula $$R^2{}_2NR^3{-} \quad (II)$$

in which $R^2$ is hydrogen or an alkyl, cycloalkyl or an aminoalkyl radical and $R^3$ is a divalent hydrocarbon radical.

3. The organopolysiloxane composition of claim 1, wherein the organopolysiloxane containing units of formula (I) has a viscosity of from 5 to 5000 cSt at 25° C.

4. The organopolysiloxane composition of claim 1, which contains constituent (C) in an amount up to 250% by weight, based on the total weight of constituent (A).

5. The organopolysiloxane composition of claim 1, which contains constituent (B) in amounts of from 0.1 to 200% by weight, based on the total weight of constituent (A).

6. The organopolysiloxane composition of claim 1, which also contains quaternary ammonium compounds (D), cyclic diorganopolysiloxanes (E) and alkoxysilanes (F).

7. The organopolysiloxane composition of claim 6, wherein the quaternary ammonium compounds (D) has the general formula $$R^4{}_4N^+(X^-)_v \quad (III)$$

in which $R^4$ is a monovalent organic radical, X is an anion, selected from the group consisting of a halide, sulfate, oleate, acetate, phosphate, nitrate and carboxylate ion, and v is equal to the reciprocal value of the valency of the anion.

8. The organopolysiloxane composition of claim 1, which contains water in amounts of from 0 to 70% by weight, based on the total weight of constituent (A).

* * * * *